United States Patent [19]
Moser, deceased et al.

[11] 3,928,076
[45] Dec. 23, 1975

[54] LiCl INHIBITOR FOR PERCHLORATE BATTERY

[75] Inventors: James R. Moser, deceased, late of Shrewsbury, Pa., by Karen Moser, executrix, Bakersfield, Calif.

[73] Assignee: The United States of America as represented by the Secretary of the Army, Washington, D.C.

[22] Filed: Sept. 13, 1974

[21] Appl. No.: 505,825

[52] U.S. Cl. ............................ 136/100 M; 136/155
[51] Int. Cl.² .......................................... H01M 17/02
[58] Field of Search......... 136/100 R, 155, 107, 138

[56] References Cited
UNITED STATES PATENTS

| | | |
|---|---|---|
| 2,403,571 | 7/1946 | Wilke................................. 136/155 |
| 2,445,306 | 7/1948 | Lawson.............................. 136/155 |
| 2,612,537 | 9/1952 | Blake................................. 136/107 |
| 3,025,336 | 3/1962 | Bartosh et al................. 136/100 M |
| 3,258,367 | 6/1966 | Robinson ...................... 136/100 M |

Primary Examiner—Anthony Skapars
Attorney, Agent, or Firm—Nathan Edelberg; Robert P. Gibson; A. Victor Erkkila

[57] ABSTRACT

The efficiency of a cell containing a magnesium anode and an aqueous magnesium perchlorate electrolyte is increased by incorporation of lithium chloride in the electrolyte.

4 Claims, 2 Drawing Figures

3,928,076

LiCl INHIBITOR FOR PERCHLORATE BATTERY

BACKGROUND OF THE INVENTION

It is known that metallic magnesium, when placed in water, reacts very slowly due to a strong passivation layer or film which is formed on the metal surface after the initial reaction of the magnesium with the water. The layer of magnesium hydroxide or hydrated magnesium oxide thus formed, is very insoluble in water and thus has no tendency to expose fresh magnesium to the water. Water does penetrate the passivation film and react with the magnesium; but the rate is extremely slow, since it is dependent on the rate of diffusion of the water through the film. Variation of the pH to either side of neutrality results in an increased rate of reaction with the magnesium due to the greater solubility of the passivation film in both acid and alkaline solutions.

Because of the above mechanism, when magnesium or a magnesium alloy is employed as an anode with an electrolyte consisting essentially of an aqueous solution of magnesium perchlorate, it is common practice to saturate the electrolyte solution with lithium chromate to act as an inhibitor to the aforesaid chemical reaction serving to self-discharge the anode. Although lithium chromate is an excellent oxidizing agent, which reacts with the anode to form a thicker film, it produces a film of sufficient porosity to maintain the electrolyte conductivity and thereby inhibit reduction of cell performance. However, even though such an inhibitor effect takes place, the chemical reaction between the anode and the lithium chromate does result in a thicker oxide film on the anode, which in itself tends to retard the diffusion of electrolyte to the electrode surface and cause a significant resistance build-up and consequent reduction of cell performance. In order to maintain sufficient electrolyte at the anode to provide high performance of the cell, an inhibitor operating on this principle, such as lithium chromate, must provide sufficient porosity to the passivation film so that the diffusion of electrolyte through the film and overall high electrolyte conductivity are maintained. These two phenomena are incompatible and the best that can be achieved is to arrive at a medium condition, wherein some passivation occurs but sufficient porosity is provided in the film to permit the required conductivity and thereby inhibit the self-discharge reaction at the magnesium anode.

SUMMARY OF THE INVENTION

It is an object of the present invention to provide a novel and superior inhibitor for the self-discharge reaction at the magnesium-containing anode in contact with an aqueous magnesium perchlorate electrolyte.

Another object is to provide an improved electrolytic cell comprising an anode containing magnesium, a cathode containing manganese dioxide and an electrolyte, which consists essentially of aqueous magnesium perchlorate and contains a novel inhibitor for said self-discharge reaction, whereby improved operating life and efficiency at temperatures between −40°F. and +160°F. are attained.

Other objects of the invention will become apparent from the following description of the invention.

In accordance with the present invention the foregoing and other objects are attained by incorporation of lithium chloride as an inhibitor in an electrolyte consisting essentially of an aqueous solution of magnesium perchlorate employed in a cell containing a magnesium anode, which term is understood herein to include an anode of magnesium or a magnesium alloy.

The mechanism by which the lithium chloride inhibits the self-discharge reaction at the anode is not exactly known. It is well known that chloride ions are readily adsorbed on practically all surfaces. In the present invention it is believed that the self-discharge reaction is inhibited by physical adsorption of chloride ions on the surface of the magnesium containing anode, thereby forming a semi-permeable shield against excess electrolyte reaching the anode surface while the cell is in the wet condition. When a load is placed across the cell terminals, the chloride ions are expelled from the anode surface so that the majority of the active anode surface area is available to carry and sustain the electrochemical reaction. Since a considerably lower amount of oxide film is formed due to the lower self-discharge rate, undesired resistance increases due to oxide film are minimized. When the load is removed from the cell, the chloride ions will again adsorb on the active anode surface. Only after long periods of time does this effect of the chloride ions become negligible due to the overwhelming effect of the chemical and electrochemical reaction products.

PREFERRED EMBODIMENTS OF THE INVENTION

The following example illustrates a specific embodiment of the present invention. However, it will be understood to be illustrative only and not to limit the invention in any manner.

Figure 1:
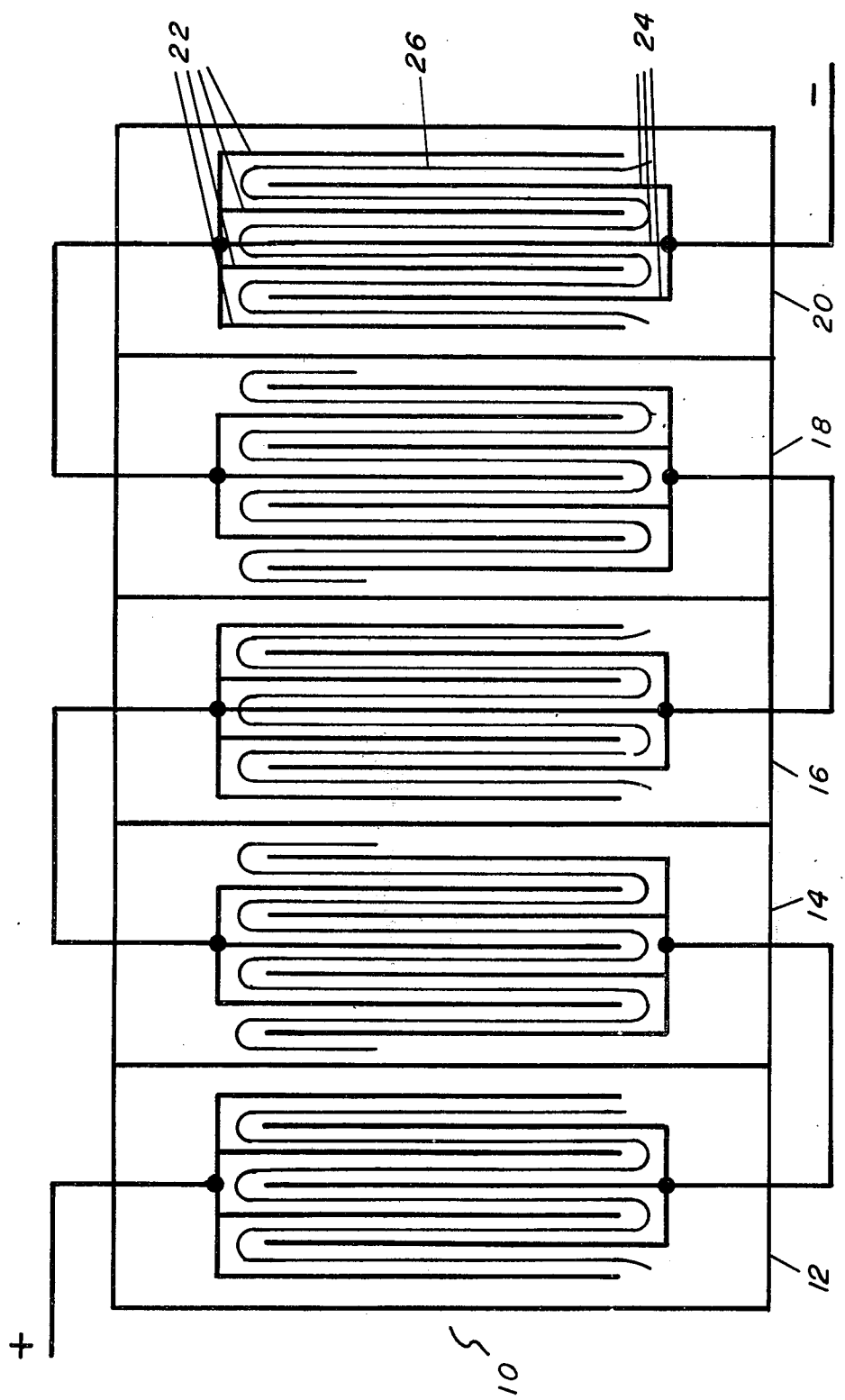
FIG. 1 is a diagrammatic cross-sectional view of an electric battery embodying the present invention.

FIG. 1 illustrates a battery utilizing a magnesium perchlorate electrolyte containing the lithium chloride inhibitor of the present invention. As shown therein, the battery 10 comprises five cells 12, 14, 16, 18 and 20 connected in series. Each cell consists of four anode plates 22 connected in parallel and three cathode plates 24 connected in parallel. The anode and cathode plates are separated from each other by a suitable separator material, e.g. 576 Schleicher filter paper or 1 Whatman filter paper. The filter paper is in the form of a continuous ribbon 26, which is somewhat wider than the plates and passes over one plate and under the next, as shown in the drawing.

The anode plates 12 are composed of magnesium alloy containing 3% by weight of thorium, 0.5–1% zirconium and the remainder of magnesium (sold under the tradename HK-31 magnesium alloy by the Dow Chemical Company) each 2 ¾ × 1 ⅝ × 0.015 inches in size, which had been subjected to a ferric nitrate pickling process.

The cathode plates are obtained by spreading in a mold on both sides of a grid of silver 4/0 mesh a paste of the following composition and pressing until the cathode becomes firm and dry:

84.0% by weight manganese dioxide, $MnO_2$
13.5% by weight finely divided carbon (Shawinigan Black Carbon)

1.5% by weight Solka-Flock filler
1.0% by weight carboxyl methyl cellulose binder The dimensions of the cathode plates are 1 ½ × 2 ½ × 0.050 inches.

The five series connected cells are contained in a battery case 1.70 × 3.20 × 3.30 inches in size having walls of ⅛ inch thick Plexiglas.

The battery thus described was activated by addition of 50 ml. (10 ml. to each cell) of standard magnesium perchlorate electrolyte containing the novel lithium chloride inhibitor, as follows:

3.5 normal $Mg(ClO_4)_2$
1.5 normal $Ca(ClO_4)_2$
0.1 normal LiCl

Figure 2:
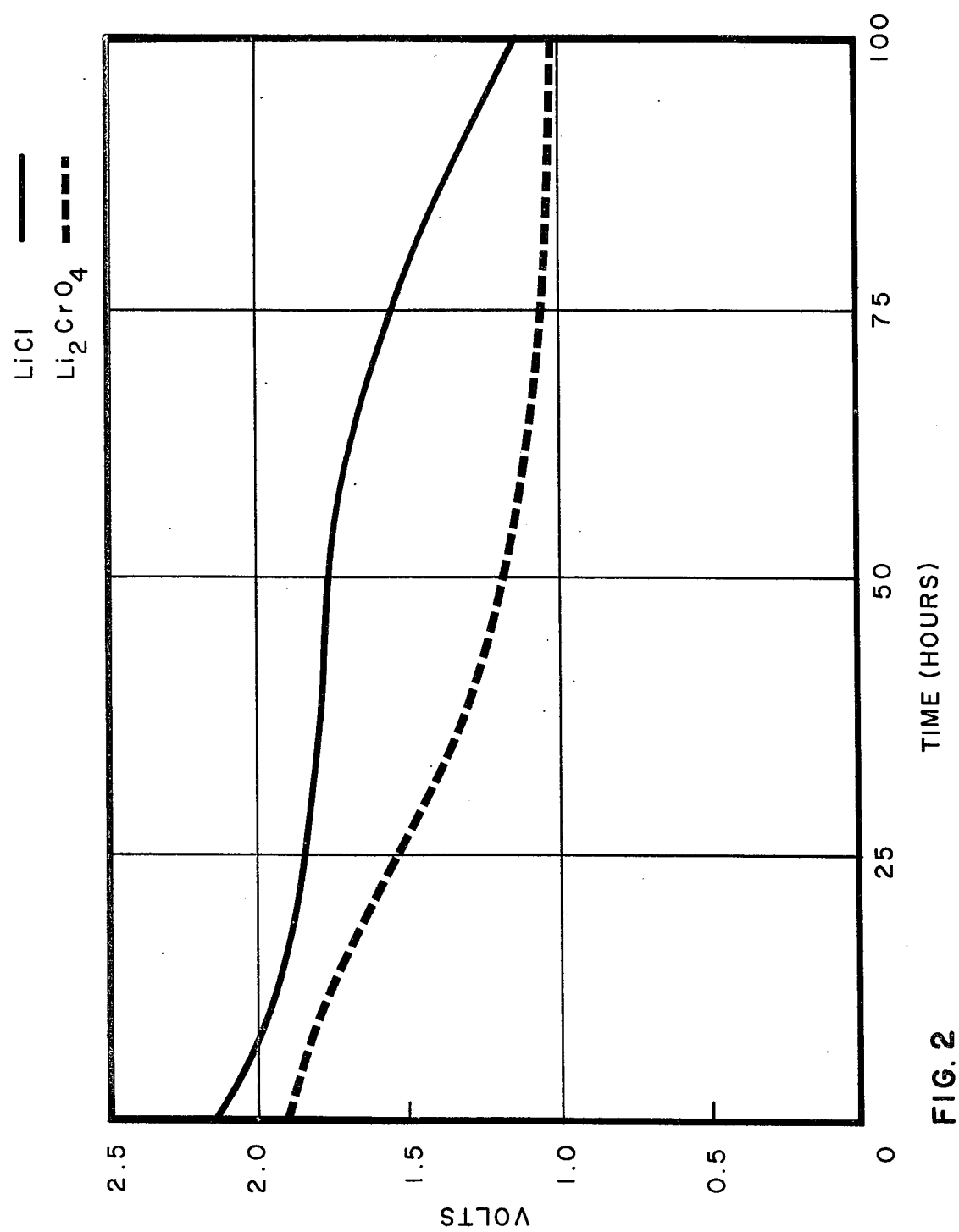
FIG. 2 represents curves showing the minimum pulse voltages versus time obtained by use of LiCl inhibitor of the present invention and those obtained with the standard $Li_2CrO_4$ inhibitor in a magnesium perchlorate battery.

The activated battery thus obtained, which had a running voltage averaging 1.5 volts/cell, was then subjected to the following load profile; ten pulsing periods, each of 56.12 seconds duration and occurring aperiodically, at 0.600 ampere, during a 100 hour test period at 160°F. The curve for LiCl in FIG. 2 shows the minimum pulse voltages thus obtained versus time.

An identical battery was activated with 50 ml. of standard magnesium perchlorate electrolyte containing conventional lithium chromate inhibitor of the following composition:

3.5 normal $Mg(ClO_4)_2$
1.5 normal $Ca(ClO_4)_2$
1% $Li_2CrO_4$ and tested under the same conditions as described above. The curve for $Li_2CrO_4$ in FIG. 2 shows the minimum pulse voltages thus obtained versus time.

A comparison of these curves shows that the lithium chloride inhibitor is more than 100% more effective than the lithium chromate inhibitor in retarding the self-discharge reaction with the water in the electrolyte. For example, the minimum pulse voltage obtained with standard electrolyte containing LiCl inhibitor was always higher, and after about 75 hours was still approximately as great as that obtained after 25 hours with the same electrolyte containing conventional $Li_2CrO_4$ inhibitor. Also, the lowest pulse voltage delivered during the 100 hour period by means of the standard electrolyte containing LiCl inhibitor was 1.15 volts versus 1.01 volts obtained with the same electrolyte containing the $Li_2CrO_4$ inhibitor.

The tests further showed that the LiCl greatly reduced initial voltage drop and the hydroxide build-up on the anode to a greater degree than $Li_2CrO_4$. The greater reduction of magnesium hydroxide formation on the anode is an important advantage, since it would minimize swelling and even rupture of a battery during active stand.

Similar results were obtained by employing (1) an anode consisting of magnesium metal in place of the aforesaid HK-31 magnesium alloy and (2) the same aqueous magnesium perchlorate electrolyte containing the LiCl inhibitor but containing no calcium perchlorate.

Aqueous magnesium perchlorate electrolytes for electrolytic cells containing magnesium or magnesium alloy anodes are well known as are the amounts of such electrolytes to be used in such cells.

The example shows a preferred concentration of LiCl inhibitor added to the aqueous magnesium perchlorate electrolyte. However, the amount of LiCl added to the electrolyte can be varied widely from the minimum amount, which is effective to reduce the hydroxide build-up and self-discharge reaction at the anode in contact with said electrolyte, up to a saturated solution.

The foregoing disclosure and drawings are merely illustrative of the principles of this invention and are not to be interpreted in a limiting sense. I wish it to be understood that I do not desire to be limited to exact details of construction shown and described for obvious modifications will occur to a person skilled in the art.

What is claimed is:

1. A cell comprising a magnesium anode, a cathode and an electrolyte consisting essentially of aqueous magnesium perchlorate, wherein the electrolyte contains lithium chloride in sufficient amount to inhibit the self-discharge reaction at said anode.

2. A cell according to claim 1, wherein the cathode consists essentially of manganese dioxide.

3. A cell according to claim 2, wherein the electrolyte additionally contains calcium perchlorate.

4. A cell according to claim 3, wherein the electrolyte has the following composition:
3.5 normal magnesium perchlorate
1.5 normal calcium perchlorate
0.1 normal lithium chloride

* * * * *